United States Patent

[11] 3,801,332
[45] Apr. 2, 1974

Cadmus

[54] ORGANIC MERCURY COMPOSITIONS

[75] Inventor: Eugene L. Cadmus, Glen Ridge, N.J.

[73] Assignee: Ventron Corporation, Beverly, Mass.

[22] Filed: Apr. 26, 1971

[21] Appl. No.: 137,621

Related U.S. Application Data

[63] Continuation-in-part of Ser. No. 889,350, Dec. 30, 1969, abandoned.

[52] U.S. Cl................ 106/15 AF, 106/18, 106/266, 260/29.6 BM, 260/41 R, 424/291
[51] Int. Cl................................................ C09d 5/14
[58] Field of Search............ 106/15 AF, 16, 17, 18, 106/266; 424/291; 260/29.6 BM, 41 R

[56] References Cited
UNITED STATES PATENTS

| | | | |
|---|---|---|---|
| 2,075,971 | 4/1937 | Baile | 260/13 |
| 2,097,339 | 10/1937 | Patterson et al. | 106/18 X |
| 2,423,044 | 6/1947 | Nowak | 106/15 X |
| 2,991,183 | 7/1961 | Lederer et al. | 106/18 |

*Primary Examiner*—Lorenzo B. Hayes

[57] ABSTRACT

Coating compositions, such as latex and oil-based paints, contain, as a biocide, a biocidal effective amount of an organomercuric composition which contains 50–90 percent, by weight, polymercurated benzene and the remainder monomercurated benzene.

10 Claims, No Drawings

ORGANIC MERCURY COMPOSITIONS

CROSS-REFERENCE TO OTHER APPLICATIONS

This application is a continuation-in-part of application Ser. No. 889,350, filed Dec. 30, 1969 now abandoned.

BACKGROUND OF THE INVENTION

Organic mercury compounds are well known to the art as biocides, i.e., possessing fungicidal and bactericidal activity, and which are therefore useful in various systems as the active component of a fungicidal or bactericidal composition. The compounds most commonly used are represented by the formula:

R—Hg—X wherein R represents a phenyl radical and X represents an anion such as acetate, propionate, hydroxyl, etc. The most widely used compound is phenyl mercuric acetate. Such compounds are commonly referred to in the literature as mono-mercurated compounds because of the single atom of mercury present in the compound.

The methods generally employed in the preparation of the monomercurated compounds, however, produce a number of by-products which are characterized by the art as contaminants. The presence of such contaminants may result in a relatively low yield of the desired compound. Such contaminants include diphenyl mercury, mercurated acetic acid, mercurous or mercuric acetate and poly-mercurated compounds. Polymercurated compounds are understood in the art to be that class of compounds which possess two or more atoms of mercury. Thus, such compounds may be represented by the formula:

R—(Hg—X)$_n$ wherein R is an aromatic radical, generally benzene, X is an anion and n is an integer of at least 2 and corresponds to the number of mercury atoms in the compound. Of the greatest concern in the manufacture of organic mercury compounds are the polymercurated compounds described directly above, i.e., the excessive production of the byproduct polymercurated species with the desired monomercurated species.

The prior art has almost universally regarded polymercurated compounds as undesirable impurities; for example, U.S. Pat. Nos. 2,075,971 and 2,353,312 characterize such compounds as contaminants and propose methods for the preparation of monomercurated compounds which will minimize or eliminate the coproduction of the polymercurated compounds. The principal reason for attacking the contaimintion problem from the viewpoint of processing is because of the difficulty of separating the mercurated products. Often distillation methods are required which are sufficiently costly as to render the process uneconomical.

In addition to the patent literature, technical journals have also treated the problem of efficient monomercurization. Thus, Industrial and Engineering Chemistry Vol. 33, February, 1941, page 170 and Vol. 34, March, 1942, page 309 disclose mercuration processes which will minimize polymercuration. The undesirability of the polymercurated products is also discussed.

The literature also considered the polymercurated compounds to be substantially lacking in fungicidal effect (Chemical Abstracts 52, 5334e (1958).

The art does contain some reference to polymercurated compounds as possessing some utility. U.S. Pat. No. 2,991,183 discloses a composition comprising phenyl mercuric propionate and 3–15 percent of di-(propionoxy mercuric)benzene. The purpose of the specific dimercurated compound is to aid in the preparation of water-miscible organic solvent solutions of the specified monomercurated compound, i.e., to impart enhanced water solubility. The specificity of both components and their levels are clearly spelled out in the patent.

U.S. Pat. No. 2,094,085 refers to polymercurated toluene compounds as seed disinfectants. The use of such compounds for seed disinfectants does not indicate that such materials would have utility for any other biocidal purpose since characteristics such as permanence, solubility, staining, biocidal efficiency and other properties which will be discussed in detail below are not required for seed disinfectants. It should be noted that seed disinfecting is, in effect, a gross treatment wherein a biocide is broadcast over a relatively wide area with little consideration to the actual concentration and uniform effectiveness of the material.

U.S. Pat. No. 3,034,949 contains general disclosure to compositions which could include polymercurated compounds but is specifically directed to a synergistic composition of a single organic mercury compound and tetrathiuram disulfide and further requires that this composition contain not more than 2 percent moisture. Such composition would, therefore, be useless in coating compositions such as paint, for example.

As stated above, the art has been concerned with avoiding or minimizing the presence of polymercurated compounds in monomercurated biocidal compositions. Polymercurated compound contamination has been particularly avoided by the art in coating compositions, particularly paint. The factors for such a position include lack of permanence (leaching by water) and sulfide staining. As will be noted below, a contamination level of as much as 50 percent polymercurated compounds shows substantially no advantage with respect to biocidal activity, heat stability or permanence. In addition, the increased amounts of mercury in the compositions would indicate that the composition would be susceptible to a greater degree of sulfide staining, a phenomenon that must be avoided in providing biocides for paints since it would be detrimental to the aesthetic appearance of the coated surface.

Most recently, concern for ecology, and particularly the contamination of waters by chemical agents, has resulted in organomercury compounds falling into disfavor, as components of compositions such as paints, because of the possibility of the mercuric compound leaching out.

SUMMARY OF THE INVENTION

It has now been found that coating compositions of improved biocidal activity can be prepared employing as the biocidal agent an organomercury composition which is predominantly polymercurated compound. Such compositions are, unexpectedly, not as susceptible to the deficiencies of the prior art with respect to weathering and biocidal activity. On the contrary, it has been unexpectedly found that while mercurated compositions containing 50 percent or less polymercurated components exhibit substantially no difference with respect to weathering and biocidal activity, compositions which are predominantly polymercurated, i.e., in excess of 50 percent polymercurated, preferably 50 to 95 percent, exhibit significantly increased resistance to weathering, greater biocidal activity than has been achieved with even 100 percent monomercurated compounds such as phenyl mercuric acetate, but also again contrary to what would be expected, does not possess the detrimental sulfide staining characteristics and is compatible with a variety of coating compositions, including oil- and water-based paints. The substantially decreased tendency to "weathering", i.e., leaching or loss of the polymercurated compound, minimizes contamination of the environment.

DETAILED DESCRIPTION OF THE INVENTION

The present invention is directed to coating compositions, particularly paint compositions containing a biocidal effective amount of an organic mercury composition which is predominantly polymercurated compounds. The biocidal composition may contain monomercurated organic compounds such as phenyl mercuric acetate, as well as other mercurated compounds, but it is predominantly one or more organic polymercurated compounds.

The polymercurated compounds may be represented by the formula:

$$R-(Hg-X)_n$$

wherein R is a phenyl radical, X is an anion and n is an integer of 2 to 6, preferably 2 to 3. It should be understood that the phenyl radical may also be substituted by, for example, a halogen such as chlorine, an alkyl radical, preferably lower alkyl such as ethyl; hydroxyl and nitro aromatic radicals, such as aromatic amines, e.g., aniline; and heterocyclic nitrogenous compounds such as pyridine. The anion preferably includes acetate, propionate, lactate, oleate, borate, and succinate, e.g., n-dodecyl succinate. The particular substituents on the aromatic radical and the anion, X, are not critical and are limited only by the particular utility in which the compounds are to be employed. Thus, any substituent or anion which would be deleterious for a particular formulation for which the biocide is to be employed would not be chosen. Conversely, a specific anion may be desired for a particular advantageous property in a given formulation. Preferably, the phenyl radical is unsubstituted and the anion is an alkyl ester such as acetate, propionate, oleate or dodecyl succinate.

The polymercurated compound comprises at least 50 percent, by weight, of the total organic mercury compound with monomercurated organic compounds such as phenyl mercuric acetate and other compounds such as residual starting compounds and by-products making up the remainder of the biocidal composition. While the biocidal organic mercury compositions containing polymercurated compounds may contain 50-95 percent by weight of the polymercurated component, a preferred range of polymercurated is from 60-80 percent, more preferably 75 percent. The 60-80 percent range is also preferred from a manufacturing point of view, i.e., difficult separation techniques do not have to be employed to the degree necessary in obtaining the higher concentrations of the polymercurated compounds; and the efficiency of biocidal activity is relatively high over substantially the entire range. Even at the 75 percent level of polymercurated compound biocidal activity of as much as six times as much as that found with 100 percent phenyl mercuric acetate is observed on an equivalent mercury level.

Of the polymercurated compound, generally 65 percent or more is dimercurated with the remainder trimercurated species although the specific ratio of components may vary epending upon the method of preparation and separation techniques employed.

The term "biocide," as used herein, is intended to refer to compounds which function, and which have been referred to, as microbiocides, mildewicides, fungicides, bacteriocides, slimicides, preservatives and antifouling compounds. The biocides of the present invention are advantageously employed to protect coating compositions such as oil-based and water-based paints from the effects of putrification of organic ingredients which can act as nutrient hosts to bacteria, enzymes, and other forms of life. The term "latex" paints as used herein is intended to refer to aqueous polymeric latics employed as the vehicle in paint. Biocides are also important in oil-based and latex paint films which are susceptible to mildew and fungus growth. Similarly, ingredients such as proteins, alginate gums and carboxymethyl cellulose are also protected from degradation in the presence of enzymes by biocides.

Representative latex (water-based) paint formulations suitable for use in the present invention include the following:

| Formula A | Parts by Weight |
|---|---|
| Cellulose thickener, 15,000 cps (1% solution) | 200 |
| Pigment dispersing agent (25% solution) | 8 |
| Defoamer | 2 |
| Rutile titanium dioxide | 300 |
| Extender pigment (talc) | 150 |
| Water | 150 |
| Polyvinyl acetate emulsion (47-50% solids) | 400-425 |
| Organo-mercuric fungicide | — |

The synthetic polymers used as the latex include vinyl acetate and acrylic polymers. The amount of the fungicide employed varies upon the degree of protection desired.

A representative acrylic latex paint suitable for use in the present invention is as follows:

| Formula B | Parts by Weight |
|---|---|
| Hydroxyethyl cellulose | 343 |
| Tamal 731 (Rohm & Haas Co.) liquid dispersant | 34 |
| Liquid wetting agent | 10 |
| Defoamer | 7 |
| Ethylene glycol | 102 |
| Amonium hydroxide | 14 |
| Titanium dioxide | 595 |
| Calcium carbonate | 1,300 |
| Water | 540 |
| Acrylic latex emulsion | 1,375 |
| Organo-mercuric fungicide | — |

A representative linseed oil house paint suitable for use in the present invention is as follows:

| Formula C | Parts by Weight |
|---|---|
| Titanium dioxide | 1,450 |
| Talc | 1,650 |
| Linseed Oil | 1,497 |
| Mineral spirits | 514 |
| Dispersing Agent | 62 |
| Cobalt Naphthenate (6% metal) | 5 |
| Manganese naphthenate (6% metal) | 5 |
| Methyl-ethyl ketoxime | 10 |
| Organo-mercuric fungicide | — |

Polymercurated compounds are prepared by methods known to the art; for example, by heating an aromatic compound such as benzene with a mercuric salt such as mercuric oxide or mercuric acetate in the presence of glacial acetic acid. Alternatively, monomercurated compounds, such as phenyl mercuric acetate, are heated with mercuric oxide. Ratios of the ingredients, reaction temperatures, specific catalysts and the like can also be varied to optimize the yield of polymercurated components. Other methods of preparation will be obvious to one skilled in the art. Suitable separation and concentration methods are employed such as benzene extraction procedures to provide the levels of polymercurated components contemplated by the present invention.

A particularly preferred method of preparation comprises charging to water, acetic acid, mercuric acetate, phenlmercuric acetate (24.9 percent polymercurated). The mixture is heated to reflux, with agitation. After 6 and 12 hours the reaction mixture of such a process was sampled and the product analyzed for polymercurated component:

| REACTION TIME HOURS | % POLYMERCURATED |
|---|---|
| 0 | 24.9 |
| 6 | 60.8 |
| 12 | 95.2 |

The product contained 67.1 percent Hg, with a melting point greater than 250°C.

The term "polymercurated," as used herein, is intended to refer to phenyl radicals which contain at least two molecules of mercury substituents on the molecules in the form indicated by the formula delineated above, i.e.,

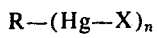

R—(Hg—X)$_n$

The preferred compound for use in the present invention is believed to be represented by the formula:

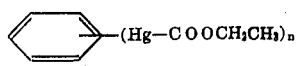

However, the precise structure of the polymercurated compound is not known. It is believed that the compound exists in several isomers. In the case of dimercurated, it is believed that the 1,2-form predominates with lesser amounts of 1,3- and 1,4-. In the case of trimercurated, it is believed that the 1,2,4-form predominates with minor amounts of 1,2,3- and 1,3,5-.

The biocides of the present invention are preferably employed in all types of coating compositions at levels ranging from 0.05 to 1.5 percent, by weight, of mercury based on the weight of the paint, more preferably a level of 0.1 percent. It should be understood, however, that the specific level selected is determined by the operator with regard to the type of paint to be protected and the degree of protection desired in the film, as well as the particular end use of the coating composition. In oil-based paints the preferred level is 0.2 percent; while the preferred level in latex or water based paints is 0.3 – 0.4 percent.

The unexpected and highly efficient characteristics of the compositions of the present invention are illustrated in the following tables in comparison with phenyl mercuric acetate, a widely used monomercurated biocide for use in paints.

In order to detect small differences in fungal growth, measurements were made by light absorption techniques. A petri dish holder was located between a light source connected to a variable rheostat and a photocell connected to a galvanometer. The instrument was zeroed with a blank consisting of a petri dish containing malt agar and a filter paper square coated with the particular paint or other coating composition under study which contains no biocide but which is innoculated with the organism and refrigerated to prevent growth. The value recorded was the rheostat setting required for the maximum deflection on the galvanometer. The difference in the rheostat setting before and after a four week incubation period under the indicated conditions was taken as a measure of fungal growth.

In Table 1, a water-based paint (Everflex BG, a vinyl acetate copolymer latex, W. R. Grace & Company, Polymer Chemicals Division, Cambridge, Massachusetts) containing 0.1 percent mercury by weight in the form of the indicated compounds, as well as the same paint with no biocide added, was applied to filter paper strips and exposed to the following test conditions:

A — "As is" — no elevated temperature or leaching conditions

B — Heat at 60° C. for 24 hours — then 72 hours at room temperature

C — Leached in running water at 40° C. for 24 hours

D — Heated at 60° C. for 24 hours — then leached at 40° C. in running water for 24 hours

TABLE 1

| Mercury Composition (0.1% Hg) | | Fungal Growth After 4 Weeks | | | |
|---|---|---|---|---|---|
| Phenyl Mercuric Acetate | Polymercurated Benzene (acetate) (> 90% dimercurated) | A | B | C | D |
| 100% | 0% | 4.7 | 6.8 | 8.0 | 19.7 |
| 75 | 25 | 5.1 | 6.2 | 7.7 | 16.6 |
| 50 | 50 | 4.4 | 6.0 | 5.5 | 12.0 |
| 25 | 75 | 2.0 | 2.5 | 2.0 | 3.0 |
| 0 | 100 | 1.5 | 2.2 | 1.4 | 2.1 |
| Control (No mercuric compounds) | | 11.0 | 28.9 | 36.0 | 40.0 |

From Table 1 it will be noted that phenyl mercuric compounds possess significant biocidal activity as evidenced by the decrease in fungal growth between the control sample and the paint samples containing the organic mercuric compounds. It will also be noted that the "weathering" of the monomercurated compounds significantly decreases the effectiveness of the compounds. In fact, the heat and leach treatment (Column D) decreases the biocidal activity of the predominantly monomercurated compounds to a level lower than that reported for the control without any weathering. These data illustrate dramatically the lack of permanence of the predominantly monomercurated compositions, indicating their deficiencies as a biocide for exterior paint use.

Levels of phenyl mercuric acetate up to and including the 50 percent level do not exhibit any substantial paints. Similar advantageous results are also achieved employing the indicated polymercurated compounds in alkyd resin-based paints.

In another test, a water-based paint, similar to Formula A, was employed with the indicated mercurated compounds at a level of 0.54 percent, by weight, of mercury and the diameter of the zone of inhibition of fungal growth was taken as a measure of effectiveness, i.e., the greater the diameter the greater the effectiveness of the biocide. A commercial composition composed of approximately 85 percent phenyl mercuric acetate was compared with a composition which was >90 percent dimercurated acetate.

TABLE 2

| Mercury Compound | Fungal Growth After 4 Weeks | | | |
|---|---|---|---|---|
|  | A | B | C | D |
| Phenyl Mercuric Acetate (100%) | 3.4 | 3.7 | 5.2 | 13.6 |
| Polymercurated Benzene (65% dimercurated benzene) | 1.6 | 2.2 | 1.4 | 2.0 |
| Control (No mercuric compound) | 9.0 | 28.9 | 35.8 | 37.2 |

Table 3 shows that while the initial biocidal activity is lower, the polymercurated benzene is more durable; at least a 50 percent decrease in permanence is noted with any leaching or elevated temperatures for the monomercurated compound while extended weathering diminishes the effectiveness about 90 percent. The biocidal effectiveness of the polymercurated compound decreases only slightly regardless of the type or extent of weathering difference in biocidal activity over the entire range which supports the published consensus of the industry as described above in detail. Even Column D at the 50 percent level shows a biocidal activity poorer than the control with no weathering. However, when the biocidal composition is predominantly polymercurated benzene, the biocidal activity increases to a degree heretofore unknown. All values of biocidal activity are significantly higher than that found in compositions which are predominantly monomercurated compounds. The most unexpected and spectacular results are found in the weathering tests, Columns B, C, and D. Any diminishing of biocidal activity, indicating the lack of permanence of the biocide is negligible; in fact the differences in values between

TABLE 3

|  | Zone of Inhibition (mm.) | |
|---|---|---|
|  | Phenyl Mercuric Acetate | Polymercurated Benzene (>90% dimercurated acetate) |
| Room temperature for 48 hours | 10.0 | 3.0 |
| Water leached – 40° C. for 48 hours | 5.0 | 3.0 |
| Heated – 158° F. for 48 hours | 5.0 | 2.0 |
| Water leached – 158° F. for 100 hours | 6.0 | 3.0 |
| " 200 hours | 5.0 | 5.0 |
| " 300 hours | 1.0 | 2.0 |

Columns A and D are very slight indicating that the specified compositions are particularly effective for use in exterior coating compositions.

The following table indicates similar measurements conducted on a linseed oil paint (Sears, Roebuck and Company, White Exterior Oil Paint) at a mercury level of 0.1 percent. The polymercurated benzene was obtained by benzene extraction techniques.

Table 2 shows that the biocidal and permanence characteristics of the polymercurated benzene compounds are achieved in oleoresinous based paints as well as water-based.

The polymercurated compositions of the present invention were compared with several commercially available mercury fungicides, and a specially prepared mono-mercurated phenyl mercuriacetate, in three different paint systems. These paints were applied to plastic test panels (to prevent any migration into the substrate) which were then exposed outdoors in New Jersey for 6 months, July to January. Samples of the paint were punched out of the panels and analyzed for mercury before, and after, exposure, by neutron activation analysis. The results are tabulated in the tables below and clearly show the greater permanence of the polymercurated com compound in paints.

TABLE 4

| Sample No. | Mercury Compound Used | Acrylic Paint (Formula B) Starting Hg Concentration in dry film % | % Hg Lost After 6 Months Exposure |
|---|---|---|---|
| 46 | Phenylmercury Oleate[1] | 0.29 | 51.46 |
| 47 | Phenylmercury Dodecenyl[1] Succinote | 0.27 | 51.87 |
| 61 | Phenylmercury Acetate (Solution)[2] | 0.30 | 44.80 |
| 62 | Phenylmercury Acetate (Solid)[3] | 0.30 | 47.72 |
| 63 | Phenylmercury Acetate (mono)[4] | 0.28 | 52.85 |
| 64 | Di-(Acetoxy mercuri)benzene[5] | 0.32 | 21.55 |
| 65 | Phenylmercury Propionate[6] | 0.30 | 47.16 |

TABLE 5

| Sample No. | Mercury Compound Used | PVA Paint (Formula A) Starting Hg Concentration in dry film % | % Hg Lost After 6 Months Exposure |
|---|---|---|---|
| 48 | Phenylmercury Oleate[1] | 0.41 | 87.91 |
| 49 | Phenylmercury Dodecenyl[1] Succinote | 0.41 | 87.15 |
| 23 | Phenylmercury Acetate (Solution)[2] | 0.40 | 83.67 |
| 50 | Phenylmercury Acetate (Solid)[3] | 0.40 | 87.27 |
| 51 | Phenylmercury Acetate (MONO)[4] | 0.39 | 90.82 |
| 52 | Di-(Acetoxy mercuri) benzene[5] | 0.39 | 54.34 |
| 53 | Phenylmercury Propionate[6] | 0.40 | 85.76 |
| 17 | Control: No Hg | 0.00 | — |

TABLE 6

| Sample No. | Mercury Compound Used | Linseed Oil Paint (Formula C) Starting Hg Concentration in dry film % | % Hg Lost After 6 Months Exposure |
|---|---|---|---|
| 34 | Phenylmercury Oleate[1] | 0.20 | 80.18 |
| 33 | Phenylmercury Dodecenyl[1] Succinote | 0.20 | 77.57 |
| 32 | Phenylmercury Acetate (Solution)[2] | 0.20 | 80.46 |
| 35 | Phenylmercury Acetate (Solid)[3] | 0.20 | 79.06 |
| 36 | Phenylmercury Acetate (mono)[4] | 0.20 | 73.71 |
| 37 | Di-(Acetoxy mercuri) benzene[5] | 0.20 | 70.49 |
| 38 | Phenylmercuric Propionate[6] | 0.20 | 79.83 |
| 25 | Control: No Hg | 0.00 | — |

1. Phenylmercury Oleate and the succinote were added as solutions in mineral spirits. The Oleate contained approximately 5 percent polymercurated.

2. The phenylmercury acetate solution uses PMA containing about 20 percent polymercurated.

3. The solid PMA is a standard commercial grade containing approximately 10 percent polymercurated.

4. A specially prepared, re-crystallized grade of PMA, containing less than 1 percent polymercurated.

5. 98 percent Dimercurated material.

6. A standard commercial preparation containing up to 15 percent polymercurated compound.

As stated above, it has been believed that sulfide stain in paints containing mercury compounds would be more prominent with increasing quantities, and, therefore would be particularly accentuated by the use of polymercurated compounds. Contrary to the expectations of the prior art, however, less sulfide staining is found in paint compositions containing polymercurated compositions as biocides than the same paints protected with monomercurated biocides; and most surprisingly, less stain than in the control paint with no mercury compound at all.

The degree of sulfide staining was determined by the following procedure. Paint was applied to filter paper strips, as described for the fungicidal tests above, and the filter paper strips (2½ in. lengths) were suspended in a 750 cc. bottle so that the bottom edge of the strip was 2 inches from the bottom of the bottle. Prior to suspending the filter paper strips in the bottle, 100 cc. of a 10 percent potassium sulfide solution and 10 cc. of 10 percent sulfuric acid were added. The bottles were closed and left at room temperature for 48 hours after which the filter paper strips were removed, rinsed with water, dried and light absorption measurements were recorded, as described above.

The following table illustrates the degree of sulfide stain (the difference in rheostat readings before and after exposure) in a commercial linseed oil paint, (exterior, white) similar in composition to Formula C with no biocide and with 0.1 percent Hg by weight.

TABLE 7

| Mercury Composition (0.1% Hg) | Degree of Sulfide Stain |
|---|---|
| Phenyl Mercuric Acetate (85%) | 55 |
| Phenyl Mercuric Acetate (100%) | 56.5 |
| Polymercurated Benzene (acetate, >90% dimercurated) | 26.5 |
| Control (No mercuric compounds) | 28 |

From the foregoing table it will be noted that less sulfide staining is observed with the composition of the present invention, or, in fact with the composition which does not contain any mercuric compound at all.

It has also been unexpectedly found that the novel biocidal compositions of the present invention are less toxic than the prior art compositions, i.e., monomercurated compounds, by a factor of at least 10.

The polymercurated compositions of the present invention may be employed as a solid, aqueous or organic solvent solutions or dispersions. As with the particular anion employed, the form of the biocidal composition is selected for use with the particular coating composition with which it is to be employed. It is also unexpected that the polymercurated composition of the present invention could be used in paint compositions since the water solubility of such compositions decreases as the amount of polymercurated component increases. Such materials may be incorporated, for example by employing an alcohol, water, amonia mix.

The polymercurated compositions of the present invention may also be suitably employed as biocides in adhesives, emulsion polymers, textiles and wood preservatives.

I claim:

1. A paint having disposed therein a biocidal effective amount of a biocidal composition whose active ingredients consist essentially of organic mercurated compounds wherein a polymercurated organic compound of the formula:

$$R-(Hg-X)_n$$

wherein R is a phenyl group, X is a radical selected from the group consisting of acetate, propionate, lactate, oleate, borate, and succinate, and n is an integer from 2 to 6, comprises about 50–95 percent, by weight, of said organic mercurated compounds and the remainder substantially comprises monomercurated organic compounds of the formula R—Hg—X.

2. The product as defined in claim 1 wherein said paint is oil-based paint.

3. The product as defined in claim 1 wherein said paint is water-based paint.

4. The product as defined in claim 1 wherein X is acetate and $n$ is 2.

5. The product as defined in claim 1 wherein said polymercurated compound comprises about 75 percent and said monomercurated compound comprises 25 percent of said organic mercurated compounds.

6. The product as defined in claim 1 wherein said polymercurated compound comprises about 65 percent and said monomercurated compound comprises 35 percent of said organic mercurated compounds.

7. The product as defined in claim 1 wherein said polymercurated compound comprises about 90 percent and said monomercurated compound comprises 10 percent of said organic mercurated compounds.

8. The product as defined in claim 1 wherein said organic mercurated compounds are present at a level of about 0.05–1.5 percent, by weight, of mercury based on the weight of said paint.

9. The product as defined in claim 2 wherein said organic mercurated compounds are present at a level of about 0.2 percent, by weight, of mercury based on the weight of said paint.

10. The product as defined in claim 3 wherein said organic mercurated compounds are present at a level of about 0.3 – 0.4 percent, by weight, of mercury based on the weight of said paint.

* * * * *